(12) United States Patent
Sugiyama

(10) Patent No.: US 8,966,604 B2
(45) Date of Patent: Feb. 24, 2015

(54) METHOD OF PREVENTING SEQUENTIAL UNAUTHORIZED LOGINS

(71) Applicant: DeNA Co., Ltd., Tokyo (JP)

(72) Inventor: Toshiharu Sugiyama, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/080,576

(22) Filed: Nov. 14, 2013

(65) Prior Publication Data

US 2014/0165175 A1 Jun. 12, 2014

(30) Foreign Application Priority Data

Dec. 10, 2012 (JP) ................................ 2012-269597

(51) Int. Cl.
| | |
|---|---|
| *H04L 29/06* | (2006.01) |
| *G06F 21/45* | (2013.01) |
| *G06F 21/55* | (2013.01) |

(52) U.S. Cl.
CPC ........ *H04L 63/08* (2013.01); *G06F 2221/2103* (2013.01); *G06F 21/45* (2013.01); *G06F 21/552* (2013.01)
USPC .......................................................... 726/8

(58) Field of Classification Search
CPC ............................... H04L 63/08; H04L 63/20
USPC .......................................................... 726/8
See application file for complete search history.

(56) References Cited

U.S. PATENT DOCUMENTS

| | | | | |
|---|---|---|---|---|
| 2001/0049787 | A1* | 12/2001 | Morikawa et al. | 713/156 |
| 2005/0160098 | A1* | 7/2005 | Campbell et al. | 707/10 |
| 2007/0186106 | A1* | 8/2007 | Ting et al. | 713/168 |

FOREIGN PATENT DOCUMENTS

| | | |
|---|---|---|
| JP | 2002-269479 | 9/2002 |
| JP | 2007-317091 | 12/2007 |
| JP | 2012-027530 | 2/2012 |

OTHER PUBLICATIONS

Japanese Office Action in connection with Japanese Patent Application No. 2012-269597 mailed on Dec. 24, 2013.
Hidenobu Seki, Basics of Windows Network based on verification, Nikkei Windows Pro, No. 97, Japan, Nikkei Business Publications, Inc., Apr. 1, 2005, pp. 132-139.

* cited by examiner

*Primary Examiner* — Jason K Gee
(74) *Attorney, Agent, or Firm* — Pillsbury Winthrop Shaw Pittman LLP

(57) ABSTRACT

One object is to restrain unauthorized logins without significantly reducing usability. In accordance with one aspect, a server device according to an embodiment includes: an information storage unit for storing information; a setting unit for setting a value conversion rule used for login authentication; an information generating unit for generating login authentication information in response to a display request for a login screen sent from a terminal device; a sending unit for sending login screen data for displaying the login screen on the terminal device; a receiving unit for receiving login information from the terminal device; a determination unit for determining whether a login is permitted based on the received login information; a monitoring unit for monitoring the situation of unauthorized logins to the server device; and a selection unit for selecting a candidate for a new value conversion rule in accordance with the situation of unauthorized logins.

8 Claims, 8 Drawing Sheets

Value Conversion Rule
Management Table 51a

| Value Conversion Rule ID |
|---|
| Group ID |
| Value Conversion Rule Name |
| ... |

Fig. 4

Token Management Table 51b

| Terminal ID | Token |
|---|---|
| gaFsaCn93rqQad3 | 8jaDaad9MdfiSap |
| 4Gsd9P8yt6rZfkLaf | Pf943rWad8Qrdc |
| IS3dsH84p3q9Au8 | o3ciesAipgUawE |
| ... | ... |

Fig. 5

```
<script>
function login() {
  var token = "cdrq8dawr349fp";
  form.token.value = token.split("").reverse().join("");
  form.submit();
}
</script>
```

```
<form action="http://www.example.com/login" method="post" name="form" onsubmit="login()">
User ID  <input type="text" name="login_id" value="" size="10" /><br>
Password <input type="password" name="password" size="10" maxlength="20" /><br>
 <input type="hidden" name="token" value="" /><br>
 <input type="submit" value="Login" />
</form>
```

Fig. 7

METHOD OF PREVENTING SEQUENTIAL UNAUTHORIZED LOGINS

CROSS-REFERENCE TO RELATED APPLICATIONS

This application is based on and claims the benefit of priority from Japanese Patent Application Serial No. 2012-269597 (filed on Dec. 10, 2012), the contents of which are hereby incorporated by reference in their entirety.

TECHNICAL FIELD

This invention relates to a server device and a method of managing logins, and particularly to a server device communicatively connected to a plurality of client terminals and a method of managing logins using the server device.

BACKGROUND

Conventionally known server devices of this type include server devices for providing various services such as electronic commerce to users of client terminals connected to the server device via a network such as the Internet. A user can log in the server device with a user ID and a password to use various services. For example, electronic commerce frequently handles information confidential to users such as credit card information; therefore, it is required to prevent an unauthorized login by a malicious third party. Such an unauthorized login is often performed with a program tool exclusively for unauthorized login. Methods proposed to prevent unauthorized logins include IP address restriction that restricts sequential login attempts from a same IP address, image authentication in which a user visually recognizes and inputs a character string included in an image displayed in a screen, and login with a temporarily available password issued by a one-time password generation device (see, for example, Japanese Patent Application Publication No. 2012-27530).

However, IP address restriction may be bypassed by randomizing the IP addresses by using a botnet and excessive restriction may restrict logins by normal users. Additionally, the above-mentioned image authentication and authentication by the one-time password generation device reduce usability because these authentications require a user to visually recognize and input a character string included in an image or to carry a one-time password generation device.

SUMMARY

One object of the present invention is to restrict unauthorized logins without significantly reducing usability. Other objects of the present invention will be apparent with reference to the entire description in this specification.

The server device according to an embodiment of the present invention is a server device communicatively connected to a plurality of client terminals, the server device comprising: a storage unit configured to store information on a plurality of value conversion processes; a setting unit configured to set a value conversion process included in the plurality of value conversion processes as a specific value conversion process; a sending unit configured to send an instruction for the specific value conversion process to one of the plurality of client terminals in response to a request from the client terminal; a receiving unit configured to receive, from the client terminal, a login request including a result of the specific value conversion process on a parameter value; a determination unit configured to determine whether to permit a login by the client terminal based at least on the received result and a selection unit configured to select, on a predetermined condition, a candidate for a new specific value conversion process from the plurality of value conversion processes stored in the storage unit.

The method of managing unauthorized logins according to an embodiment of the present invention is a method of managing logins by using a server device communicatively connected to a plurality of client terminals and having a storage unit, the method comprising the steps of: (a) storing, on the storage unit, information on a plurality of value conversion processes; (b) setting a value conversion process included in the plurality of value conversion processes as a specific value conversion process; (c) sending an instruction for the specific value conversion process to one of the plurality of client terminals in response to a request from the client terminal; (d) receiving, from the client terminal, a login request including a result of the specific value conversion process on a parameter value; (e) determining whether to permit a login by the client terminal based at least on the received result; and (f) selecting, on a predetermined condition, a candidate for a new specific value conversion process from the plurality of value conversion processes stored in the storage unit.

Various embodiments of the present invention restrain unauthorized logins without significantly reducing usability.

BRIEF DESCRIPTION OF THE DRAWINGS

FIG. 4 is a diagram showing an example of a value conversion rule management table according to an embodiment.

FIG. 5 is a diagram showing a specific example of a token management table according to an embodiment.

FIG. 7 is a diagram showing an example of login screen data according to an embodiment.

DESCRIPTION OF EXAMPLE EMBODIMENTS

Figure 1:
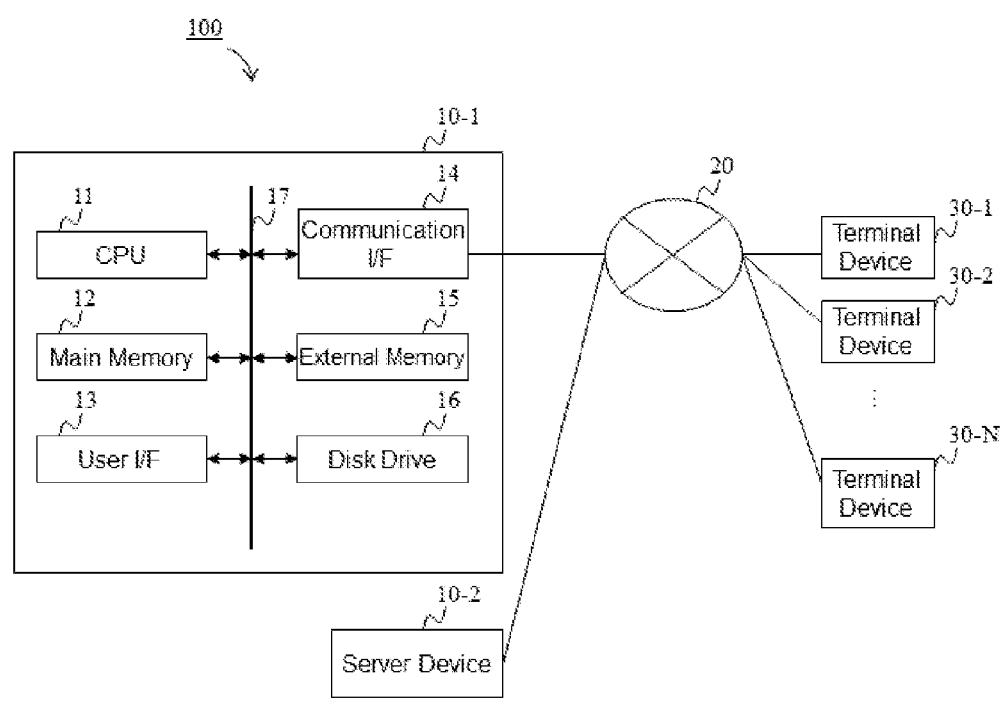
FIG. 1 is a block diagram schematically illustrating a network configuration of a system including a server device according to an embodiment of the present invention.

Various embodiments of the present invention will be described hereinafter with reference to the drawings. In the drawings, the same components are denoted by the same reference numerals.

FIG. 1 is a block diagram schematically showing a system 100 according to an embodiment of the present invention including server devices 10-1, 10-2 (hereinafter collectively referred to as "server devices 10") according to an embodiment of the present invention. As illustrated in FIG. 1, the system 100 according to an embodiment may be provided with the server devices 10-1, 10-2 and is communicatively connected to a plurality of terminal devices 30-1, 30-2, . . . , and 30-N (hereinafter also collectively referred to as the "terminal devices 30"), each having a communication function, via a communication network 20 such as the Internet.

As illustrated in FIG. 1, a server device 10 according to an embodiment may include a central processing unit (CPU) 11, a main memory 12, a user interface (I/F) 13, a communication I/F 14, an external memory 15, and a disk drive 16, and these components may be electrically connected to one another via a bus 17. The CPU 11 may load an operating system and various programs into the main memory 12 from the external memory 15, and may execute commands included in the loaded programs. The main memory 12 may be used to store a program to be executed by the CPU 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminal devices 30 via the communication network 20.

The external memory 15 may be formed of, for example, a magnetic disk drive and may store various programs. The external memory 15 may also store various data. The various data that may be stored in the external memory 15 may also be stored on a database server communicatively connected to the server device 10 and physically separate from the server device 10. The disk drive 16 may read data stored in a storage medium such as a compact disc read only memory (CD-ROM), digital versatile disc read only memory (DVD-ROM), or DVD Recordable (DVD-R) disc, or write data to such a storage medium. For example, applications and data stored in a storage medium may be read by the disk drive 16, and may be installed into the external memory 15.

In an embodiment, the server device 10 may serve as a web server for communicating with the terminal devices 30 in HTTP to manage a web site including a plurality of hierarchical web pages and provide the terminal devices 30 with various services. The terminal devices 30 may fetch HTML data for rendering a web page from the server device 10 and analyze the HTML data to present the web page to a user of the terminal devices 30. The HTML data for rendering the web page may also be stored on the external memory 15. The HTML data may comprise HTML documents written in markup languages such as HTML; the HTML documents may be associated with various images. Additionally, the HTML documents may include programs written in script languages such as ActionScript™ and JavaScript™.

The external memory 15 may store applications to be executed on execution environments of the terminal device 30 other than browser software. This application may include programs and various data such as image data to be referred to for executing the programs. The programs may be created in, for example, object oriented languages such as Objective-C™ and Java™. The created programs may be stored on the external memory 15 in the form of application software along with various data. The application software stored on the external memory 15 may be delivered to a terminal device 30 in response to a delivery request. The application software delivered from the server device 10 may be received by the terminal device 30 through a communication I/F 34 in accordance with the control of CPU 31; the received programs may be sent to an external memory 35 and stored thereon. The application software may be launched in accordance with the player's operation on the terminal device 30 and may be executed on a platform implemented on the terminal device 30 such as NgCore™ or Android™.

Thus, the server device 10 may manage the web site for providing services and deliver web pages constituting the web site in response to a request from the terminal device 30. Also, the server device 10 can provide services based on communication with an application performed on the terminal device 30 in place of, or in addition to, such browser-based services. Whichever mode may be taken to provide the services, the server device 10 can store data required to provide the services for each identification identifying a user. Non-limiting examples of the services provided by the server device 10 include online games, social networking services (SNS), electronic commerce, and distribution of digital contents such as music, electronic books, or videos.

In an embodiment, the terminal device 30 may be a desired information processing device capable of rendering, on a web browser, web pages fetched from the server device 10; for example, the terminal device 30 may be a mobile phone, smart phone, game console, personal computer, touch pad, or electronic book reader, but is not limited thereto. The terminal device 30 may also be a desired information processing device including an application execution environment for executing an application.

Figure 2:
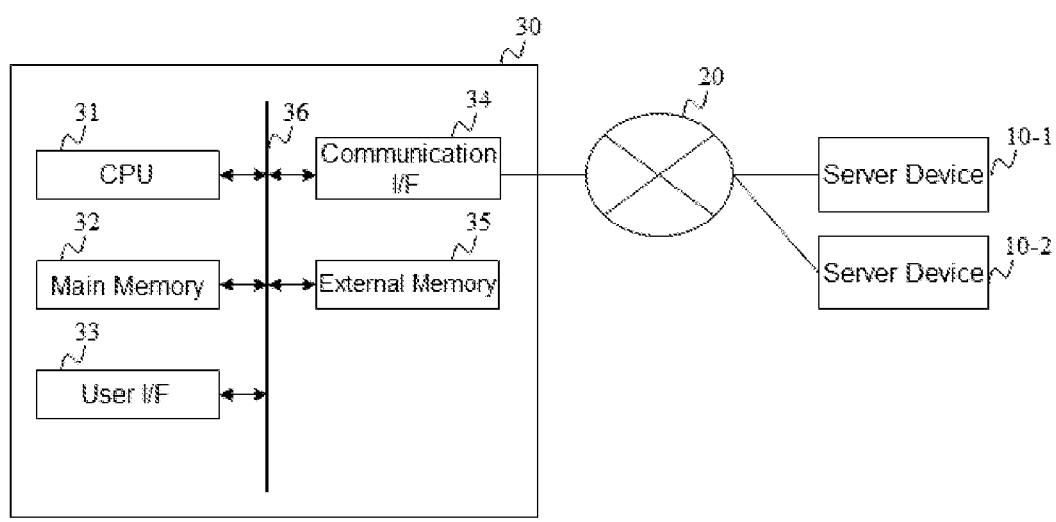
FIG. 2 is a block diagram schematically illustrating the architecture of a terminal device according to an embodiment.

The architecture of the terminal device 30 will be described with reference to FIG. 2. FIG. 2 is a block diagram schematically illustrating the architecture of a terminal device 30. As illustrated in FIG. 2, the terminal device 30 may include a central processing unit (CPU) 31, a main memory 32, a user interface (I/F) 33, a communication I/F 34, and an external memory 35, and these components may be electrically connected to one another via a bus 36.

The CPU 31 may load various programs such as an operating system into the main memory 32 from the external memory 35, and may execute commands included in the loaded programs. The main memory 32 may be used to store a program to be executed by the CPU 31, and may be formed of, for example, a dynamic random access memory (DRAM).

The user I/F 33 may include, for example, an information input device such as a touch panel, a keyboard, a button, and a mouse for accepting an input from a user, and an information output device such as a liquid crystal display for outputting calculation results of the CPU 31. The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server device 10 via the communication network 20.

The external memory 35 may comprise, for example, a magnetic disk drive or a flash memory and store various programs such as an operating system. When receiving an application from a server device 10 via the communication I/F 34, the external memory 35 may store the received application.

A terminal device 30 having such an architecture may include, for example, browser software for interpreting an HTML file (HTML data) and rendering a screen; this browser software may enable the terminal device 30 to interpret the HTML data fetched from the server device 10 and render web pages corresponding to the received HTML data. Further, the terminal device 30 may include plug-in software (e.g., Flash Player distributed by Adobe Systems Incorporated) embedded into browser software; therefore, the terminal device 30 can fetch from the server device 10 a SWF file embedded in HTML data and execute the SWF file by using the browser software and the plug-in software.

Figure 3:
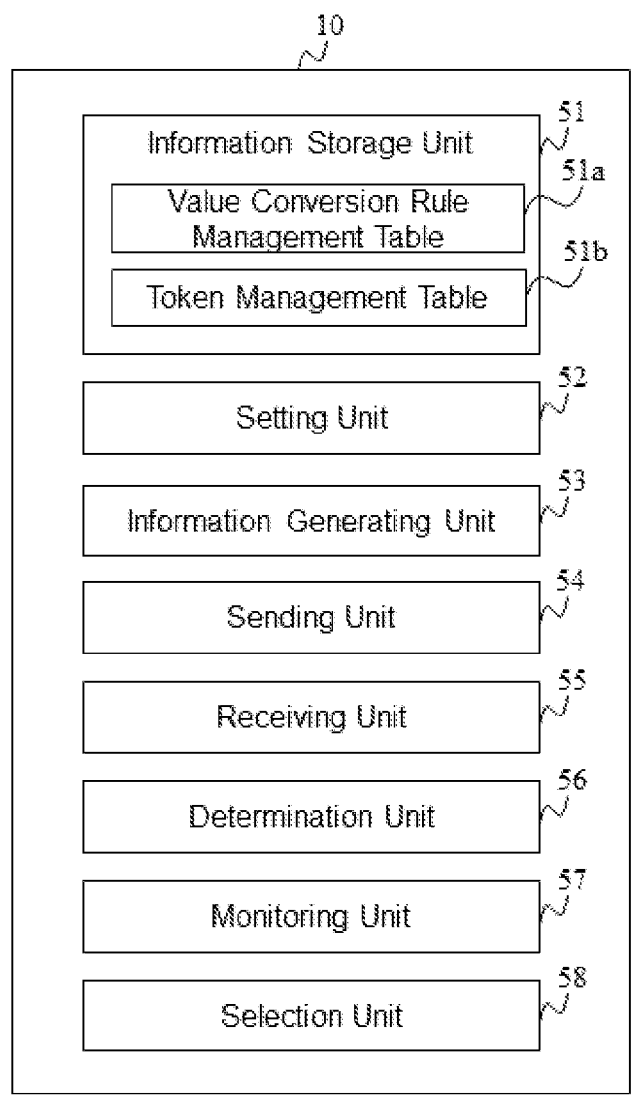
FIG. 3 is a block diagram illustrating the functionality of the server device according to an embodiment.

Next, the functionality of the server device 10 implemented by the components shown in FIG. 1 will now be described. FIG. 3 is a block diagram illustrating the functionality of a server device 10 according to an embodiment of the present invention. As shown in FIG. 3, the server device 10 according to the embodiment may comprise: an information storage unit 51 for storing information; a setting unit 52 for setting a value conversion rule used for login authentication; an information generating unit 53 for generating login authentication information in response to a display request for a login screen sent from a terminal device 30; a sending unit 54 for sending login screen data for displaying the login screen on the terminal device 30; a receiving unit 55 for receiving login information from the terminal device 30; a determination unit 56 for determining whether a login is permitted based on the received login information; a monitoring unit 57 for monitoring the situation of unauthorized logins to the server device 10; and a selection unit 58 for selecting a candidate for a new value conversion rule in accordance with the situation of unauthorized logins. These functions may be implemented through cooperation between the CPU 11 and programs, tables, and the like stored in the main memory 12 and the external memory 15. The above functions may be related to login management implemented in a server device 10 according to an embodiment; and the server device 10 may also include other various functions for providing services.

The information storage unit 51 may include a value conversion rule management table 51a for managing information on a plurality of value conversion rules used in login authentication and a token management table 51b for managing tokens as login authentication information. FIG. 4 illustrates an example of the value conversion rule management table 51a. As shown, the value conversion rule management table 51a may store, in association with a value conversion rule ID identifying a value conversion rule, a group ID identifying a group including the value conversion rule, a value conversion rule name representing the name of the value conversion rule, and other information. FIG. 5 illustrates a specific example of the token management table 51b. As shown in FIG. 5, the token management table 51b may store a token generated by the information generating unit 53 in association with the terminal ID identifying a terminal device 30. As in the examples shown in FIG. 5, both a terminal ID and a token are a character string containing a plurality of alphanumeric characters randomly arranged.

Figure 6:
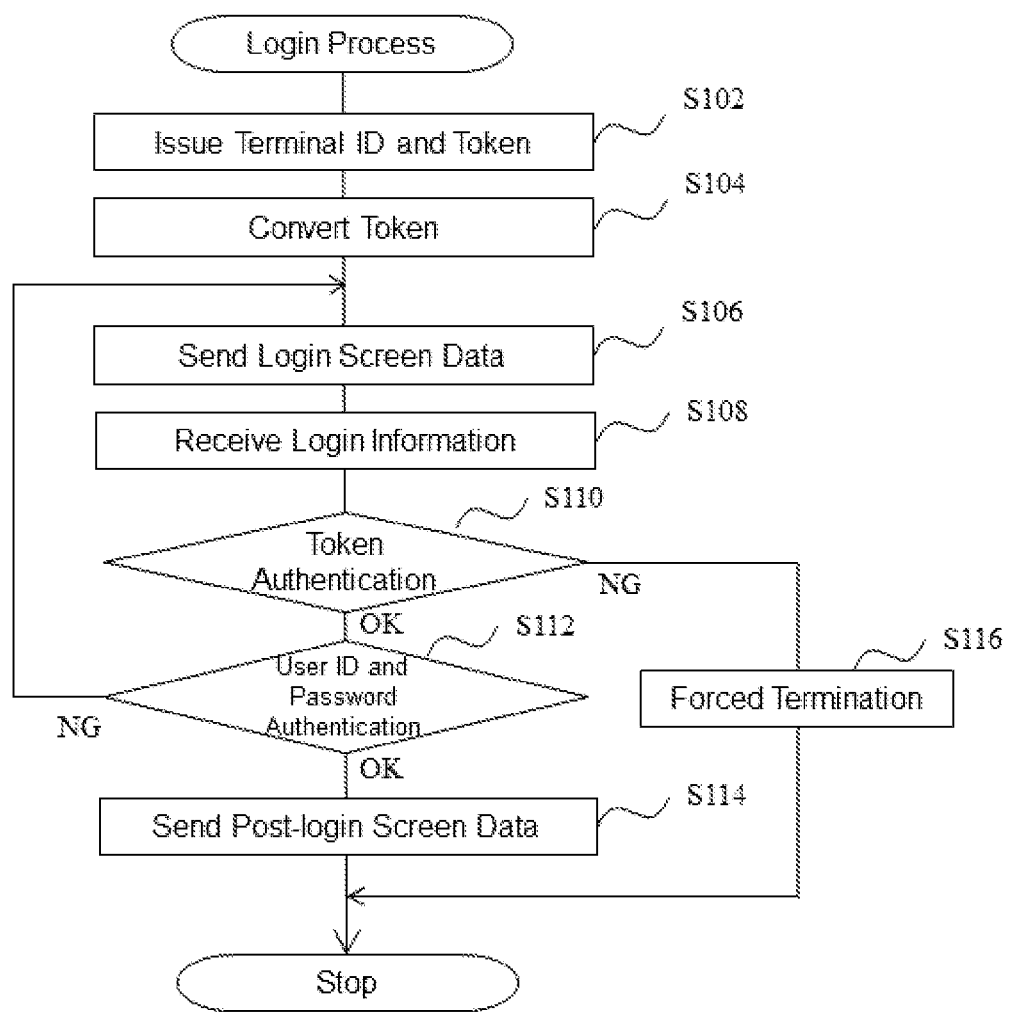
FIG. 6 is a flow diagram showing a login process according to an embodiment.

Next, operations of such a server device 10 as an embodiment of the present invention will now be described. The following description will be focused on the operation of the terminal device 30 related to logins and then on the operation related to selection of a value conversion rule in accordance with the situation of unauthorized logins. FIG. 6 is a flow diagram showing an example of a login process performed by the server device 10. The login process may be performed in response to a display request for the login screen to the server device 10, received from the terminal device 30. More specifically, in an embodiment, the login process may be performed when the server device 10 receives an HTTP request designating the URL of the login screen to the services provided by the server device 10, from a web browser or an application on the terminal device 30. The first step of the login process is to issue a terminal ID for identifying the terminal device 30 that sent the display request for the login screen and a token as authentication information used for login authentication, and store both in the token management table 51b (step S102). As described above, the terminal ID and the token may be a character string containing a plurality of alphanumeric characters randomly arranged. These random character strings may be generated by using, for example, a common gateway interface (CGI) having implemented therein a random number generating algorithm. In an embodiment, a terminal ID may identify a terminal device 30 working as a client in HTTP and may be exchanged as cookie in the HTTP communication between the server device 10 and the terminal device 30. Further, in an embodiment, a terminal ID and a token may be generated by using different algorithms such that there is no relation between them. This is because any relation between them may possibly allow a malicious third party who knows one of them to perceive the other.

After a terminal ID and a token are issued, the value of the issued token are converted (step S104). In an embodiment, the value of the issued token may be converted such that the original token is restored when converted based on a current value conversion rule (a specific value conversion rule) having been set by the setting unit 52. For a specific example, when the current value conversion rule is to "reverse the order of the character string," the order in the value of the issued token may be reversed such that the issued token is restored when the order is reversed (e.g., when the value of the issued token is "ABC," this value may be converted into "CBA" when its order is reversed, and then may be converted back into "ABC" when its order is reversed again). For another example, when the current value conversion rule is to "shift the order of the character string to the right by one character," the order in the value of the issued token may be shifted to the left by one character such that the issued token is restored when the order is shifted to the right by one character (e.g., when the value of the issued token is "ABC," this value may be converted into "BCA" when its order is shifted to the left by one character, and then may be converted back into "ABC" when its order is shifted to the right by one character). Thus, the value of the token may be converted such that the original token is restored when converted based on the current value conversion rule having been set by the setting unit 52 (in other words, with a conversion rule reverse to the current value conversion rule). Such conversion of a character string may be performed by using a CGI having implemented therein a string operation function. Additionally, the above value conversion rules are mere examples; and it is naturally possible to use other value conversion rules.

Figure 8:
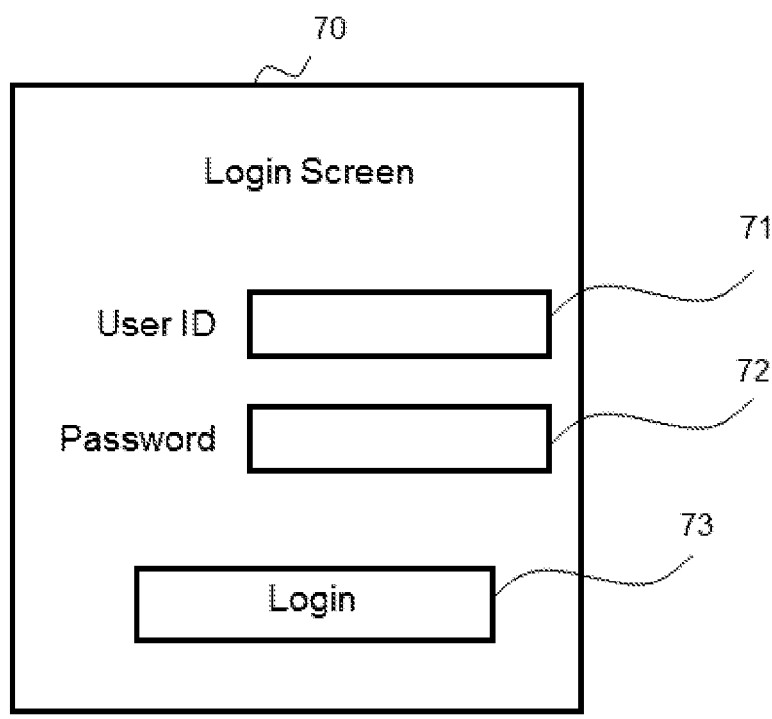
FIG. 8 is a diagram showing an example of a login screen according to an embodiment.

Next, a login screen data may be sent to the terminal device 30, the login screen data including the converted token and instructions for a process based on the current value conversion rule (step S106). FIG. 7 shows an example of a part of login screen data 60 sent from the server device 10 to the terminal device 30; and FIG. 8 shows an example of a login screen 70 displayed by a web browser, etc. on the terminal device 30 that has read the login screen data 60. As shown in FIG. 7, the login screen data 60 in this example may be formed of HTML data and include a script section 62 written in JavaScript™ and a form section 64 for defining input fields for user input. The converted token may be embedded in a description "var token='cdrQ8daWr349fP'" in the script section 62. The description "form.token.value=token. split(" ").reverse( ).join(" ");" in the script section 62 may define an instruction for the process based on the current value conversion rule, and particularly, define an instruction for reversing the order of the character string of a token in FIG. 7. That is, the token converted in step S104 may be converted back into the original token issued in step S102 when the process defined in the script section 62 is performed on the terminal device 30. The form section 64 may define input fields such as a user ID input field 71, a password input field 72, and a login button 73 in the login screen 70 shown in FIG. 7, and define the token as a hidden field that is not displayed in the login screen 70 by the description "<input type='hidden' name='token' value=''/>." The token defined as a hidden field may not be displayed in the login screen 70 but may be sent to the server device 10 along with the values inputted in the user ID input field 71 and the password input field 72.

When the terminal device 30 receives the login screen data, a web browser or other functions of the terminal device 30 may analyze the login screen data to render the login screen 70. When a user of the terminal device 30 inputs a user ID and a password into the user ID input field 71 and the password input field 72 of the login screen 70, respectively, and presses the login button 73, the process for converting the token defined in the script section 62 of the login screen data 60 may be performed, and the converted token may be sent to the server device 10 along with the inputted user ID and password.

When the terminal device 30 sends the user ID, the password, and the converted token, the server device 10 may receive these information (step S108) and first perform authentication based on the value of the converted token received (step S110). More specifically, the server device 10 may retrieve a token corresponding to the terminal ID of the terminal device 30 from the token management table 51*b* and compare the retrieved token with the converted token received from the terminal device 30; if these tokens are identical, it is determined that the authentication is successful; otherwise, it is determined that the authentication is unsuccessful. As described above, the token managed by the token management table 51*b* may be the original token issued in step S102; meanwhile, the token sent from the terminal device 30 may be tentatively converted in step S104 such that the original token is restored when converted based on the current value conversion rule, and then converted by the terminal device 30 in accordance with the instruction defined in the script section 62 of the login screen data 60. Accordingly, if operations proceed as described above, the value of the token managed in the token management table 51*b* may be identical to the value of the token received from the terminal device 30, and it may be determined that the authentication is successful Suppose that a malicious third party attempts an unauthorized login to the server device 10. In general, the program tool exclusively for unauthorized login may analyze the method of sending, to the server device, login information such as a user ID and a password required for login, based on HTML data of a login screen such as the login screen 70 to the server device 10 according to an embodiment, thereby to enable sending of login information without complete reproduction of user operations (for example, login information may be sent without using a login screen). This may enable, for example, attempts to log in to a large number of web sites with a pair of user ID and password or attempts to log in to one web site with numerous sets of user IDs and passwords. As a result, an unauthorized login may be permitted when the combination of the attempted user ID and password is valid. A method of sending login information may be analyzed by performing a search with regular expressions on character strings such as tags constituting HTML data. As to the login screen data 60 for example, it may be determined that a hidden field "token" is included as necessary login information based on the description "<input type='hidden' name='token' value=''/>" in the form section 62; and it may be determined that the value of the hidden field "token" is "cdrQ8daWr349fP" based on the description "var token='cdrQ8daWr349fP'" in the script section 62. However, in the server device 10 according to an embodiment, the token embedded in the login screen data 60 may be a character string converted from that of the original token; and if such a token is sent to the server device 10, it is not identical to the token managed in the token management table 51*b* (in the above example, the value of the token sent from the program tool is "cdrQ8daWr349fP"; meanwhile, the value of the token managed by the token management table 51*b* is "Pf943rWad8Qrdc"). In this case, it may be determined that the authentication is unsuccessful, and the login process may be forcibly terminated (step S116).

After it is determined that the authentication is successful based on the value of the token, the authentication based on the user ID and the password may be performed (step S112). The authentication based on the user ID and the password may be performed by, for example, matching the user ID and the password with sets of user IDs and passwords stored in a table, etc. included in the information storage unit 51 and not shown in the figures, the sets of user IDs and passwords being previously inputted by users for user registration to services provided by the server device 10. Since such authentication based on the user ID and the password is conventional, further detailed description is omitted. When, as a result of the authentication based on the user ID and password, it is determined that the authentication is unsuccessful, the processing may return to step S106, where the server device 10 may send the login screen data 60 again. When it is determined that the authentication is successful, the server device 10 may send screen data of a screen subsequent to the login (e.g., the top screen of a service to be provided) to the terminal device 30 (step S114) and ends the login process.

Figure 9:
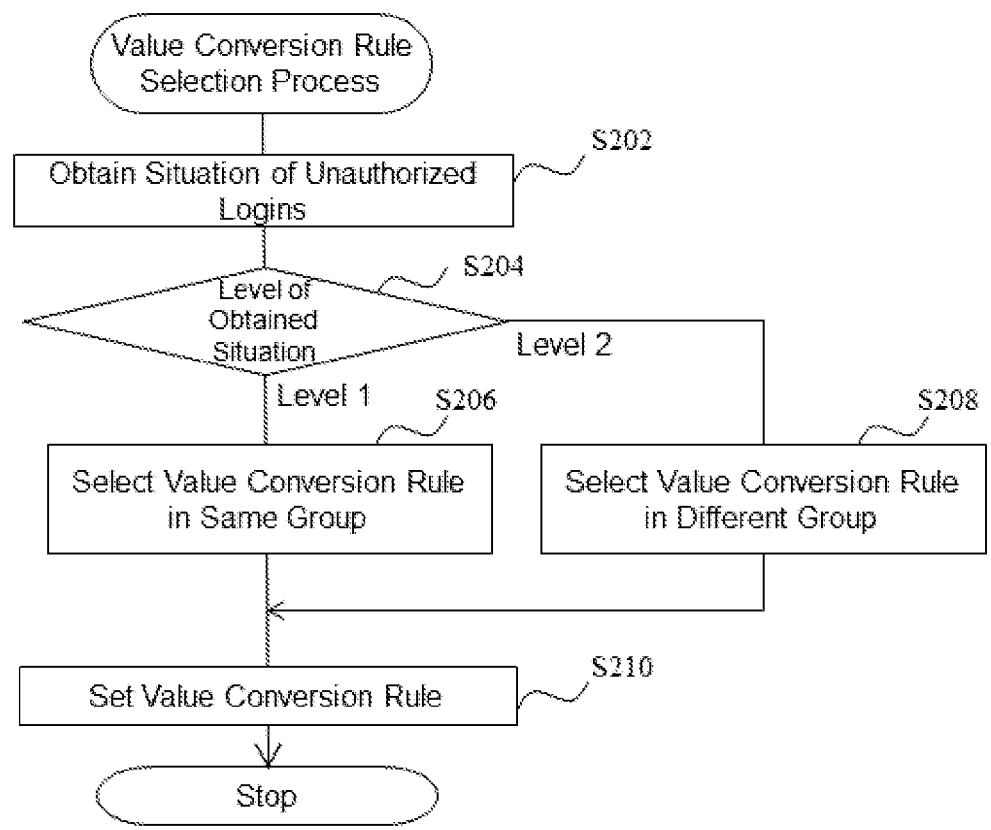
FIG. 9 is a flow diagram showing a value conversion rule selection process according to an embodiment.

The above was the description on the operation of the server device 10 related to login by the terminal device 30. Next to be described is an operation by the server device 10 related to selection of a value conversion rule in accordance with the situation of unauthorized logins. FIG. 9 is a flow diagram showing an example of a value conversion rule selection process performed by the server device 10. The value conversion rule selection process may be performed when the monitoring unit 57 detects an unauthorized login. The monitoring unit 57 may detect an unauthorized login by monitoring various accesses to the server device 10; for example, it monitors the number of times of unsuccessful authentications based on a token in the above login process, the number of times of unsuccessful authentications based on a user ID and a password in the above login process, the number of times of attempted accesses to files without access authority, and the number of times of errors for HTTP requests. When these parameters indicating unauthorized accesses exceed predetermined threshold values, the monitoring unit 57 may determine an unauthorized login. These parameters may also be managed for each communication type and for each communication partner. Since such detection processes for unauthorized logins are conventional to those skilled in the art, further detailed description will be omitted.

The first step of the value conversion rule selection process may be to obtain the situation of unauthorized logins detected by the monitoring unit 57 (step S202). In an embodiment, the situation of unauthorized logins may be detected at two levels, level 1 and level 2. For example, level 1 may be determined when the number of times of unsuccessful authentications based on tokens in a unit of time exceeds a threshold value; and level 2 may be determined when the number of times of unsuccessful authentications based on user IDs and passwords in a unit of time exceeds a threshold value. Alternatively, for example, level 1 may be determined when the number of times of errors for HTTP requests in a unit of time exceeds a first threshold value; level 2 may be determined when the same number of times exceeds a second threshold value larger than the first threshold value. Thus, levels of the situation of unauthorized logins may be set in accordance with the type of a parameter indicating unauthorized logins or may be set in accordance with the magnitude of the value of a parameter indicating unauthorized logins. Naturally, these levels may also be set in various ways other than the above examples.

The step after obtaining the situation of unauthorized logins is to select a new value conversion rule in accordance with the level of the situation of unauthorized logins (steps S204 to S208). When the situation of unauthorized logins is level 1, a candidate for a new value conversion rule may be selected from value conversion rules included in the same group as the current value conversion rule (step S206). As described above, the value conversion rule management table 51a of the information storage unit 51 may manage grouping of value conversion rules; and based on this grouping, a group is determined for each value conversion rule. In an embodiment, one value conversion rule may be randomly selected from a plurality of value conversion rules included in the same group as the current value conversion rule. Such random selection may use random numbers. Other methods may be used to select one value conversion rule from a plurality of value conversion rules included in the same group; for example, it may also be possible to preset the order of a plurality of value conversion rules in the same group and select a value conversion rule in accordance with the preset order. In this case, the value conversion rule management table 51a may manage the order of the value conversion rules.

Meanwhile, when the situation of unauthorized logins is level 2, a candidate for a new value conversion rule may be selected from value conversion rules included in a different group than the current value conversion rule (step S208). In an embodiment, one value conversion rule may be randomly selected from a plurality of value conversion rules included in a different group than the current value conversion rule. As in the selection of a value conversion rule included in the same group described above, a value conversion rule included in a different group may be selected by various methods. For example, it may also be possible to preset group order, specify the next group based on the preset group order, and select one value conversion rule from a plurality of value conversion rules included in the specified group.

Thus, a candidate for a new value conversion rule may be selected; and the selected value conversion rule may be set as the new value conversion rule by the setting unit 52 (step S210). Then, the value conversion rule selection process may be ended. The setting unit 52 may also set a value conversion rule by, for example, managing, in the value conversion rule management table 51a, the information identifying the current value conversion rule. When a new value conversion rule is set by the setting unit 52, the new value conversion rule may be applied to the processes of token conversion (step S104 in FIG. 6) and sending of login screen data (step S106 in FIG. 6) in the login process described above. That is, in step S104 shown in FIG. 6, a value conversion process may be performed such that the original token is restored when converted based on the new value conversion rule; and in step S106 shown in FIG. 6, login screen data including instructions for a process based on the new value conversion rule may be sent to the terminal device 30. The processes may be thus changed in accordance with switching of the value conversion rule, by preparing programs for each value conversion rule and using a CGI having implemented therein a process for performing the program for the new value conversion rule.

Thus, the server device 10 according to the embodiment may switch, in the value conversion rule selection process, the value conversion rule used in login authentication to another value conversion rule in the same group or to another value conversion rule in a different group (that is, switching between groups) in accordance with the situation of unauthorized logins. For example, if a plurality of value conversion rules included in the same group used switchingly are decoded, the group may be switched to select another value conversion rule, thereby inhibiting unauthorized logins.

Further, in the system 100, the server device 10-1 and the server device 10-2 perform the above login process and the value conversion rule selection process independently from each other; therefore, the server device 10-1 and the server device 10-2 may select and set different value conversion rules (the contents of value conversion rules managed by the value conversion rule management table 51a may be different). Thus, if the method of sending login information of the login screen to one of the server devices is decoded, unauthorized logins through the login screen to the other server device may be prevented. For example, suppose that one business operates the server device 10-1 and the server device 10-2 for different services. Even if an unauthorized login to one of the services becomes possible, an unauthorized login to the other can be prevented.

The server device 10 according to the embodiment of the present invention described above may issue, in response to a display request for the login screen to the server device 10 from a terminal device 30, a token to the terminal device 30, while converting the issued token such that the original token may be restored when converted based on the current value conversion rule; and then the server device 10 may send, to the terminal device 30, login screen data including the converted token and an instruction for the process based on the current value conversion rule, receive the converted token as part of login information from the terminal device 30, and perform authentication based on the received token. This may inhibit unauthorized logins attempted by generally used program tools for unauthorized logins that analyze login screen data by searching character strings included therein. Further, since a user of the terminal device 30 does not have to be conscious of this system of login determination, the usability may not be significantly reduced. Additionally, since the value conversion rule may be switched in accordance with the situation of unauthorized logins, the unauthorized logins may be further inhibited.

The server device 10 according to the embodiment may issue a token to a terminal device 30, while converting the token such that the original token may be restored when converted based on the current value conversion rule, and embed the converted token into login screen data. Alternatively, the server device 10 may also embed the token as issued into the login screen data without conversion. In this case, the terminal device 30 may send a token converted from the original token based on the current value conversion rule; therefore, the server device 10 may compare the value of the received token with the value of the token converted from the issued token based on the current value conversion rule to perform the token-based authentication in step S110. In this mode, a token sent from a program tool for unauthorized logins, which is an as-issued token, can be detected in the token-based authentication; thus, an unauthorized login can be prevented.

In the server device 10 according to the embodiment, login screen data including a converted token and an instruction for a process based on the current value conversion rule may be sent to the terminal device 30; alternatively, the server device 10 may send only an instruction for a process based on the current value conversion rule. In this case, the terminal device 30 may convert its own parameter (e.g., a user ID entered on the login screen), instead of a token, based on a value conversion rule; and the server device 10 may receive the pre-conversion parameter and the converted parameter and compare the converted parameter value with the value converted from the pre-conversion parameter value based on the current value conversion rule, thereby to determine whether the login should be permitted.

The server device 10 according to the embodiment may form a token as a character string having a plurality of alphanumeric characters randomly arranged; alternatively, the token may not be a character string. For example, if a token is a numeric value, an appropriate mathematical operation, not a string operation, may also be applied to the value conversion process.

In the value conversion rule selection process shown in FIG. 9 and performed by the server device 10 according to the embodiment, the setting unit 52 may set a selected value conversion rule as a new value conversion rule; further, it may also be possible that the selection unit 58 should cause the information output device serving as the user I/F 13 of the server device 10 to display the selected value conversion rule. Thus, a selected candidate for a new value conversion rule may be informed to the administrator of the server device 10. Further, it may also be possible that a selected value conversion rule should not be set as a new value conversion rule by the setting unit 52 and only displayed on the information output device. In this case, the setting unit 52 may set the selected value conversion rule as a new value conversion rule in response to an input operation by the administrator, etc. through the user I/F 13.

In the server device 10 according to the embodiment, the value conversion rule management table 51a may manage grouping of value conversion rules; however, value conversion rules do not necessarily have to be managed by grouping. In this case, the value conversion rule may be switched in a random or preset order among value conversion rules managed by the value conversion rule management table 51a, or by other methods (e.g., value conversion rules may be associated with the situations (levels) of unauthorized logins, and a value conversion rule may be selected from those associated with the situation (level) of detected unauthorized logins).

In the server device 10 according to the embodiment, a candidate for a new value conversion rule may be selected when the monitoring unit 57 detects an unauthorized login; but this is not the only trigger for selecting a candidate for a new value conversion rule. For example, a candidate for a new value conversion rule may be selected for each unsuccessful authentication in a login process based on tokens, or on a regular basis (e.g., weekly or monthly). A candidate for a new value conversion rule may also be selected for each login process described above (e.g., each time login screen data is sent in step S106); that is, the value conversion rule may be switched for each login from the terminal device 30. In this case, a candidate for a new value conversion rule may be selected from value conversion rules included in the same group for each login process; and when an unauthorized login is detected, a candidate for a new value conversion rule may be selected from value conversion rules included in a different group (switching the group).

The system 100 according to the embodiment may include the server device 10-1 and the server device 10-2; but the system 100 may include more than two server devices 10. Naturally, various system configurations are possible; for example, the monitoring unit 57 included in the server device 10 may also be included in another server device, firewall, or a proxy server not shown in the drawings.

The processes and procedures described and illustrated herein may also be implemented by software, hardware, or any combination thereof other than those explicitly stated for the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

Even if the processes and the procedures described herein are executed by a single apparatus, software piece, component, or module, such processes and procedures may also be executed by a plurality of apparatuses, software pieces, components, and/or modules. Even if the data, tables, or databases described herein are stored in a single memory, such data, tables, or databases may also be dispersed and stored in a plurality of memories included in a single apparatus or in a plurality of memories dispersed and arranged in a plurality of apparatuses. The elements of the software and the hardware described herein can be integrated into fewer constituent elements or can be decomposed into more constituent elements.

With respect to the use of substantially any plural and/or singular terms herein, those having skill in the art can translate from the plural to the singular and/or from the singular to the plural as is appropriate to the context.

What is claimed is:

1. A server device communicatively connected to a plurality of client terminals, the server device comprising:
   a central processing unit;
   memory storage configured to store machine readable instructions, when executed, causing the central processing unit to:
      store information on a plurality of value conversion processes;
      set a value conversion process included in the plurality of value conversion processes as a specific value conversion process;
      send an instruction for the specific value conversion process to one of the plurality of client terminals in response to a request from the client terminal;
      receive, from the client terminal, a login request including a result of the specific value conversion process on a parameter value;
      determine whether to permit a login by the client terminal based at least on the received result;
      select, on a predetermined condition, a candidate for a new specific value conversion process from the plurality of value conversion processes; and
      monitor situation of unauthorized logins,
   wherein the groups are stored to include the value conversion processes as a part of the information on the plurality of value conversion processes,
   and wherein if the situation of unauthorized logins is a first situation, the candidate is selected for the new specific value conversion process from value conversion processes included in the same group as the current specific value conversion process; and if the situation of unauthorized logins is a second situation, the candidate is selected for the new specific value conversion process from value conversion processes included in a different group than the current specific value conversion process.

2. The server device of claim 1 wherein information on the selected candidate for the new specific value conversion process is caused to be displayed on a display device for an administrator.

3. The server device of claim 1 wherein the candidate selected for the new specific value conversion process is set as the specific value conversion process.

4. The server device of claim 1, wherein the candidate is selected for the new specific value conversion process each time the predetermined condition is satisfied, the predetermined condition being that the instruction is sent for the specific value conversion process.

5. The server device of claim 1 wherein login page information for displaying a login page on the client terminal is sent to the client terminal, the login page information including the parameter value and the instruction for the specific value conversion process.

6. The server device of claim 5, wherein the central processing unit is further caused to generate, in response to a request from the client terminal, authentication information for the client terminal and generate, based on the authentication information, pre-conversion authentication information to be converted into the authentication information through the specific value conversion process, wherein the pre-conversion authentication information as the parameter value is sent to the client terminal; and whether to permit a login by the client terminal is determined based at least on comparison of the received result and the authentication information.

7. The server device of claim 5 wherein the parameter value is a character string, and the value conversion process operates a character string.

8. A method of managing logins by using a server device communicatively connected to a plurality of client terminals and having a storage unit, the method comprising the steps of:
   (a) storing, on the storage unit, information on a plurality of value conversion processes;
   (b) setting a value conversion process included in the plurality of value conversion processes as a specific value conversion process;
   (c) sending an instruction for the specific value conversion process to one of the plurality of client terminals in response to a request from the client terminal;
   (d) receiving, from the client terminal, a login request including a result of the specific value conversion process on a parameter value;
   (e) determining whether to permit a login by the client terminal based at least on the received result;
   (f) selecting, on a predetermined condition, a candidate for a new specific value conversion process from the plurality of value conversion processes stored in the storage unit; and
   (g) monitoring situation of unauthorized logins,
   wherein the storing step (a) stores groups including the value conversion processes as a part of the information on the plurality of value conversion processes, and wherein if the situation of unauthorized logins is a first situation, the selecting step (f) selects the candidate for the new specific value conversion process from value conversion processes included in the same group as the current specific value conversion process; and if the situation of unauthorized logins is a second situation, the selecting step (f) selects the candidate for the new specific value conversion process from value conversion processes included in a different group than the current specific value conversion process.

* * * * *